(12) United States Patent
Teng

(10) Patent No.: US 7,069,373 B2
(45) Date of Patent: Jun. 27, 2006

(54) USB ENDPOINT CONTROLLER FLEXIBLE MEMORY MANAGEMENT

(75) Inventor: Peter Chu Tin Teng, Fremont, CA (US)

(73) Assignee: NEC Electronics America, Inc., Santa Clara, CA (US)

( * ) Notice: Subject to any disclaimer, the term of this patent is extended or adjusted under 35 U.S.C. 154(b) by 299 days.

(21) Appl. No.: 10/289,620

(22) Filed: Nov. 7, 2002

(65) Prior Publication Data

US 2004/0093454 A1    May 13, 2004

(51) Int. Cl.
*G06F 13/38* (2006.01)

(52) U.S. Cl. .................................. 710/310; 710/52

(58) Field of Classification Search ............ 710/52–53, 710/55–57, 310; 711/170–173; 370/412–418
See application file for complete search history.

(56) References Cited

U.S. PATENT DOCUMENTS

| | | | |
|---|---|---|---|
| 5,860,119 A * | 1/1999 | Dockser | 711/156 |
| 5,964,859 A * | 10/1999 | Steinbach et al. | 710/310 |
| 5,974,486 A * | 10/1999 | Siddappa | 710/53 |
| 6,173,355 B1 | 1/2001 | Falik et al. | 710/129 |
| 6,185,641 B1 | 2/2001 | Dunnihoo | 710/56 |
| 6,219,736 B1 * | 4/2001 | Klingman | 710/315 |
| 6,678,760 B1 * | 1/2004 | Brief | 710/52 |
| 6,721,815 B1 * | 4/2004 | Leete | 710/6 |
| 6,745,264 B1 * | 6/2004 | Luke et al. | 710/52 |
| 6,779,061 B1 * | 8/2004 | Swindle et al. | 710/71 |
| 6,804,243 B1 * | 10/2004 | Humphrey et al. | 370/395.1 |
| 6,816,929 B1 * | 11/2004 | Ueda | 710/56 |

OTHER PUBLICATIONS

Compaq et al.; "Universal Serial Bus Specification"; Apr. 27, 2000; Revision 2.0; pp. 199-216.*
Standard Microsystems Corporation; "Multi-Endpoint USB Peripheral Controller"; Standard Microsystems Corporation; Jan. 3, 2001.*
Compaq et al.; "The USB Specification"; Revision 1.1; Sep. 23, 1998; pp. 157 and 159.*
Hennessy et al.; Computer Organization and Design; Second Edition; 1998; Morgan Kaufmann Publishers Inc.; pp. 568-570.*

* cited by examiner

*Primary Examiner*—Paul R. Myers
*Assistant Examiner*—Ryan M. Stiglic
(74) *Attorney, Agent, or Firm*—Campbell Stephenson Ascolese LLP

(57) ABSTRACT

Disclosed is an apparatus and method for flexible controlling endpoint memory within an USB device. In one embodiment, the method includes a USB device receiving a first token packet from a USB host, wherein the first token packet includes a first endpoint number. The first endpoint number is stored into a first tag in memory corresponding to a first data buffer in the USB device. The USB device then receives a data packet from the USB host, wherein the data packet comprises endpoint data. The; endpoint data of the data packet is stored into the first data buffer.

14 Claims, 5 Drawing Sheets

USB ENDPOINT CONTROLLER FLEXIBLE MEMORY MANAGEMENT

BACKGROUND OF THE INVENTION

Universal Serial Bus (USB) networks are well known in the art. A USB network consists of one or more USB devices (e.g., printer, scanner, fax machine, etc.) connected directly to a USB host (e.g., a desk top computer) or indirectly to the USB host via a hub. There is only one USB host in any USB network. It is noted that communication between a USB host and a USB device can occur via a hub that attaches multiple USB devices to the USB host. A USB device may implement multiple functions which communicate with the USB host via a USB cable/connection. A multiple function USB device is known as a compound USB device. An example of a compound USB device is one that can function as a fax machine, a printer, or a scanner. A USB hub may also be included in the compound USB device.

Communication between USB host and USB devices is defined by the USB specification. The USB specification was developed by the personal computer (PC) industry. The USB specification is described in detail in the Universal Serial Bus Specification, Revision 1.1, and published Sep. 23, 1998, and Universal Serial Bus Specification, Revision 2.0 published Apr. 27, 2000, the contents of which are incorporated herein by reference in their entirety. USB host and USB devices communicate via bus transactions transmitted over a USB cable/connection. All bus transactions in the USB network involve the transmission of up to three packets between the USB host and USB device: a token packet, a data packet, and an optional transaction-complete packet. Each transaction begins when the USB host, on a scheduled basis, sends a USB token packet describing the type and direction of transaction (i.e., whether data is transmitted to the USB device from the USB host or to the USB host from the USB device), a USB device address, and an endpoint number. Each USB device has one or more endpoints designated by respective endpoint numbers. An endpoint is the ultimate source or destination for data of the data transaction. The USB device that is addressed by the token packet selects itself by decoding the appropriate address fields of the token packet. After the token packet is transmitted, data is then transferred in the data packet either from the USB host to a USB device or from a USB device to the USB host. The direction of data transfer is specified in the token packet. The destination of the transaction then sends the transaction-complete packet indicating whether data transfer was successful.

USB permits reliable communication. It can detect errors and recover from errors based on transaction type. Most transactions like, control, interrupt and bulk transaction types, require data integrity and they uses use error detection and retry. Isochronous transactions do not use retries due to delivery in time characteristic and may tolerate a higher incidence of uncorrected errors. Hence, the transaction-complete packet is not used to acknowledge the successful completion of the isochronous transaction.

FIG. 1 illustrates a USB network 10 consisting of a USB host 12 connected to a single USB device 14 via a USB cable/connection 16. For purposes of explanation, it is presumed that USB device 14 is a compound device capable of acting as a fax machine, a printer, or a scanner at any point in time. Moreover, USB device 14 includes N endpoints that are the ultimate source or destination for data of data transactions with the USB host 12. Although the present invention will be described with reference to a USB network having a USB host and a single USB device, it is understood that the present invention is not limited thereto.

FIG. 2 illustrates relevant components of a circuit 18 within USB device 14 shown in FIG. 1. More particularly, FIG. 2 shows in block diagram form, memory (e.g., RAM memory) 20 coupled between an endpoint controller 22 and a backend interface 24. Endpoint controller 22 and backend interface 24 may take form in software running on one or more embedded processors (not shown) within USB device 14. Both endpoint controller 22 and backend interface 24 are configured to access (read or write) data in memory 20. Endpoint controller 22 is coupled to USB host 12 (not shown in FIG. 2) and is configured to receive or send packets, including data packets, from the USB host 12. Backend interface 24 communicates with each of the endpoints of USB device 14 and is configured to receive or send data to the endpoints.

Memory 20 is configured as a set of endpoint buffers designated endpoint buffers 1–N corresponding to endpoints 1–N, respectively, of USB device 14. Endpoint buffers 1–N temporarily store data of endpoints 1–N, respectively, transmitted between endpoints of USB device 14 and USB host 12. To illustrate, endpoint controller 22 may receive a token packet identifying endpoint 2 of USB device 14 as the ultimate sink of new data that will be subsequently transmitted by USB host 12. Upon receipt of the token packet, a data packet is sent from USB host 12 containing endpoint 2 data for storage in endpoint buffer 2. Endpoint controller 22 determines whether endpoint buffer 2 has sufficient memory for receiving the new data. If endpoint controller 22 determines that endpoint buffer 2 has sufficient memory space, endpoint controller 22 sends an acknowledgement packet back to USB host 12. In response, a data packet is sent from USB host 12 containing endpoint 2 data for storage in endpoint buffer 2. Then then endpoint controller 22 sends an acknowledgement packet back to USB host 12 indicating the status of success or failure for the data transfer. When the data transaction from USB host 12 to endpoint controller 22 has finished, endpoint controller 22 alerts backend interface 24 that endpoint buffer 2 contains new data. Eventually, backend interface 24 reads and forwards data contained within endpoint buffer 2 to the backend embedded processor or any application specific hardware of USB device 14.

Each of the endpoints in device 14 is permanently assigned a particular endpoint buffer within memory 20. The size of each endpoint buffer is predetermined. Once the buffer size is set, the buffer size cannot be changed. Data packets transmitted between USB host 12 and an endpoint of USB device 14 may vary in size. Each endpoint buffer in memory 20 should be sized to store data of the largest data packet transmitted between the USB host 12 and USB device 14 endpoint. If an endpoint buffer lacks sufficient size to store data of a transaction, the data transaction cannot be completed. Additionally, the buffer allocated to an endpoint may be large, but the buffer may have little memory space available to store new data as a result of delays in reading the existing data in the buffer. If an endpoint buffer lacks sufficient space to store data of a transaction, again, the data transaction cannot be completed.

To avoid this, the endpoint buffers are usually over sized or sized to store the transaction maximum packet size between USB host 12 and the endpoint of the USB device 14. However, the cost to manufacture USB device 14 is proportional to the size of memory 20. Thus, the greater the size of endpoint buffers 1–N in memory 20, the greater the cost of memory 20 and the greater the cost of USB device 14. Accordingly, a conflict exists between designing USB devices with large memories 20 and designing USB devices that are inexpensive.

SUMMARY OF THE INVENTION

Disclosed is an apparatus and method for flexible controlling endpoint memory within an USB device. Although the present invention will be described with reference to controlling memory in a USB device, the present invention should not be limited to use within a USB device. In one embodiment, the method includes a USB device receiving a first token packet from a USB host, wherein the first token packet includes a first endpoint number. The first endpoint number is stored into a first tag in memory corresponding to a first data buffer in the USB device. The USB device then receives a data packet from the USB host, wherein the data packet comprises endpoint data. The endpoint data of the data packet is stored into the first data buffer.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
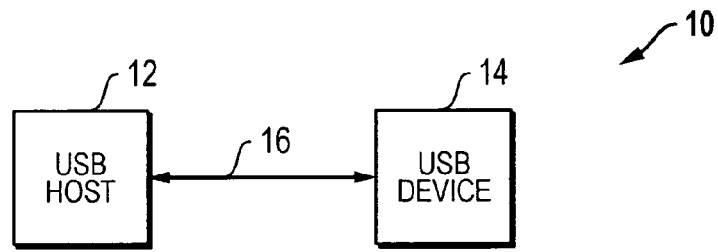
FIG. 1 is a block diagram illustrating a USB network.
Figure 2:
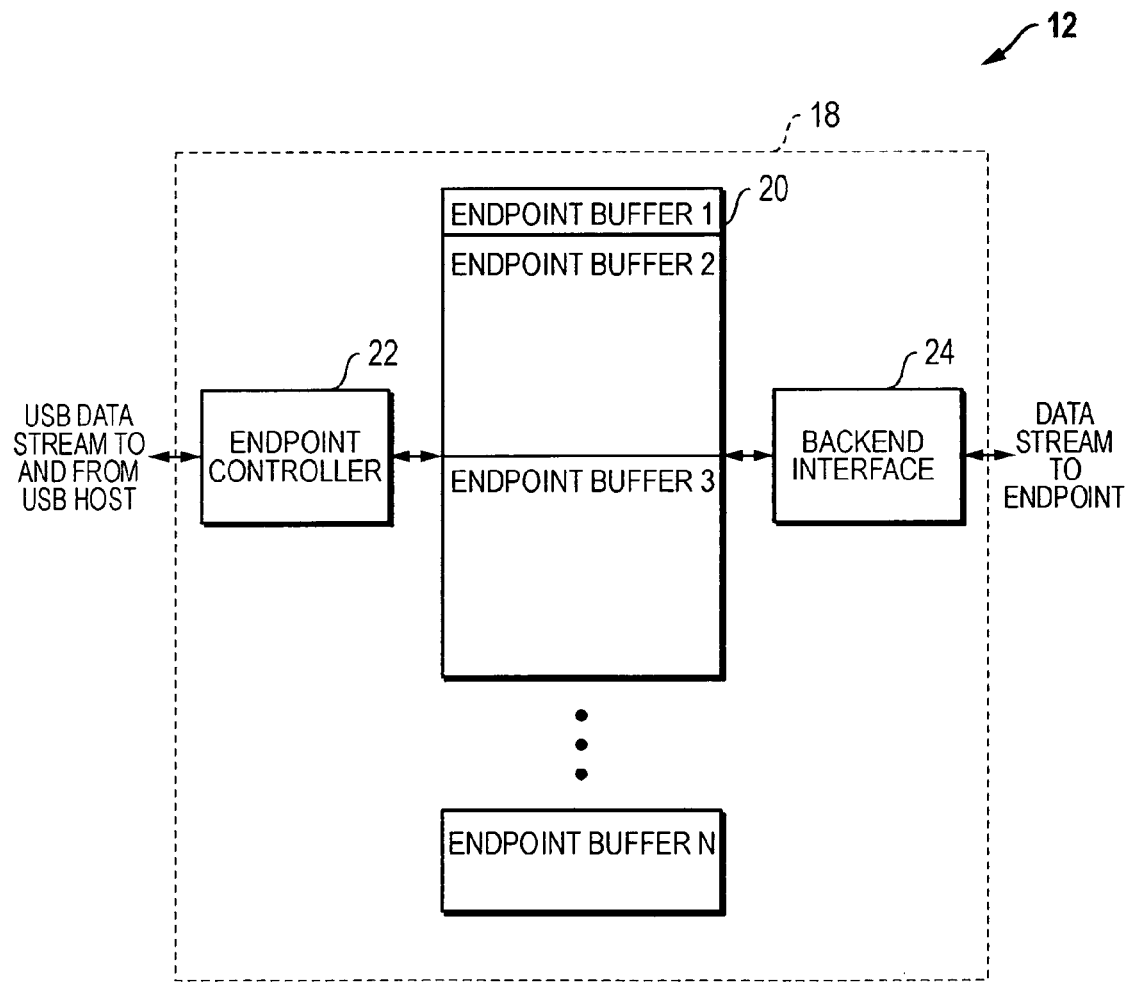
FIG. 2 is a block diagram illustrating a circuit of the USB device of FIG. 1.
Figure 3:
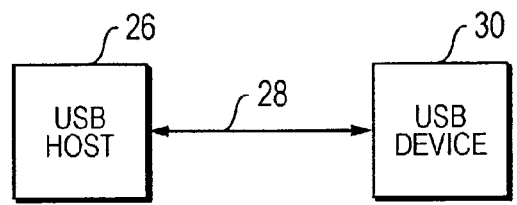
FIG. 3 is a block diagram illustrating a USB network employing one embodiment of the present invention.

FIG. 3 is a block diagram illustrating an exemplary USB network employing one embodiment of the present invention. The USB network includes a USB host 26 coupled to a USB device 30 via a USB cable/connection in 28. FIG. 3 shows USB device 30 coupled directly to USB host 26 via USB cable/connection 28. The term coupled should not be limited to what is shown in FIG. 3. Two devices (e.g., USB host 26 and USB device 30) may be coupled directly or indirectly together. For example, USB host 26 could be coupled to USB device 30 via a hub (not shown in FIG. 3). USB host 26 and USB device 30 amy may be coupled together on the same printed circuit board. Additionally, the USB device 30 and a hub can be coupled together on the same printed circuit board or by a flexible printed circuit board. Although the present invention will be described with reference to the USB network shown in FIG. 3, it should be understood that the present invention should not be limited thereto.

USB device 30 includes endpoints 1–N, each of which is designated by a unique endpoint number. Each endpoint of USB device 30 acts as a source or sink of data. Each endpoint of USB device 30 communicates with USB host 26 via data transactions transmitted over USB cable/connection 28. The data transactions typically include the transmission of up to three packets: a token packet, a data packet, and an optional transaction-complete packet. Each data transaction is initiated with a token packet generated by USB host 26. The token packet identifies the type and direction of the data transaction, the USB device address, and an endpoint number that is the ultimate source or destination of data. The token packet is followed by a data packet which includes the data to be transferred between host 26 and the endpoint identified in the token packet. Lastly, the destination of the transaction optionally sends a transaction-complete packet indicating whether the data transfer was successful between the USB host 26 and the USB device 30.

Figure 4:
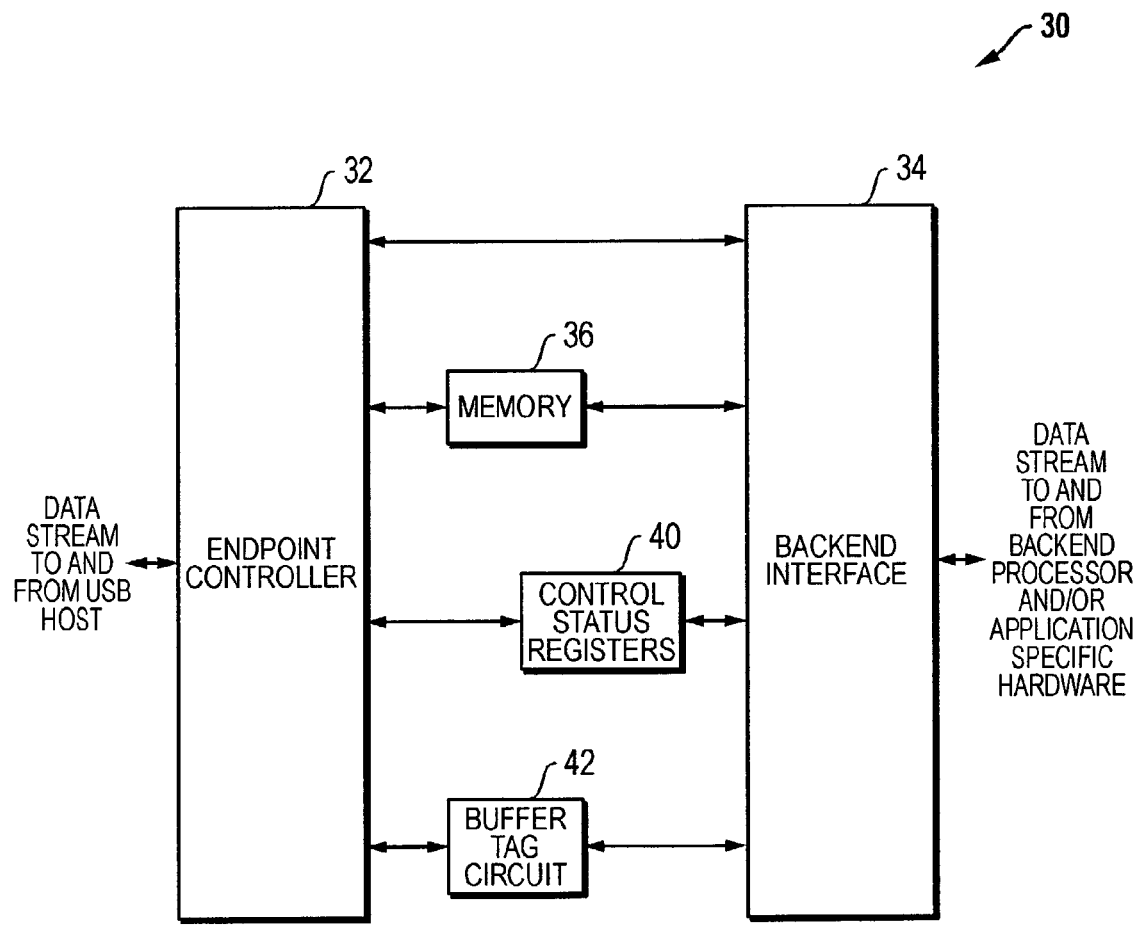
FIG. 4 is a block diagram illustrating a circuit of the USB device of FIG. 3

FIG. 4 shows relevant components (in block diagram form) of a circuit within USB device 30 of FIG. 3. More particularly, FIG. 4 shows an endpoint controller 32 coupled to backend interface 34, memory 36, a bank of control status registers 40, and a buffer tag circuit 42. Endpoint controller 32, backend interface 34, and/or buffer tag circuit 42 may take form in hardware, software, firmware, or a combination thereof. For purposes of explanation, Endpoint controller 32 and backend interface 34 take form in software instructions executing on one or more processors of USB device 26, it being understood that the present invention should not be limited thereto.

Memory 36 may take form in RAM and is configured, as will be more fully described below, as a set of equally sized buffers for temporarily storing data transmitted between endpoints of USB device 30 and USB host 26. In an alternative embodiment, memory 36 is configured as a set of unequally sized buffers or as two groups of buffers with buffers in one group equal in size but different in size to the buffers in the second group.

USB device 30, as noted above, includes N endpoints. Endpoint controller 32 and backend interface 34 process data for each of the N endpoints. Before endpoint controller 32 and backend interface 34 can process data for an endpoint, control information for the endpoint must be loaded into control status registers 40. Endpoint controller 32 and backend interface 34 may switch between different endpoints for processing data. In other words, endpoint controller 32 and backend interface 34 can stop processing data of a first endpoint transaction in order to process data of a second and different endpoint transaction. Before endpoint controller 32 and backend interface 34 can process data of the second endpoint transaction, control information for the second endpoint processing must be loaded into control status registers 40. After endpoint controller 32 and backend interface 34 processes data of the second endpoint transaction, the control information needed by endpoint controller 32 and backend interface 34 to resume processing the first endpoint transaction data, must be reloaded into the control status registers. After the control information for the first endpoint transaction is reloaded, endpoint controller 32 and backend interface 34 can resume processing first endpoint transaction data.

Figure 5:
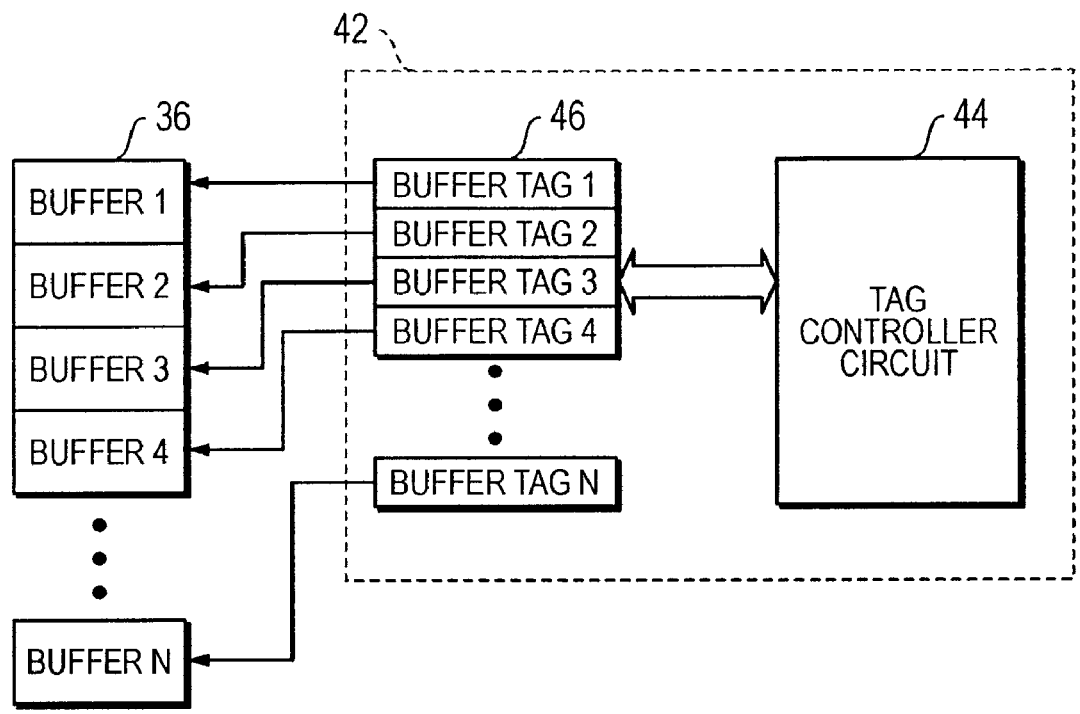
FIG. 5 is a block diagram illustrating one embodiment of the buffer tag circuit and the buffer memory of the circuit shown in FIG. 4.

As shown in FIG. 4, buffer tag circuit 42 is coupled between endpoint controller 32 and backend interface 34. FIG. 5 shows relevant components (in block diagram form) of buffer tag circuit 42. Additionally, FIG. 5 shows a more detailed view of memory 36. In FIG. 5, memory 36 includes a plurality of equally sized buffers designated buffers 1–N.

Each of the buffers 1–N is configured to store data of one or more endpoints of USB device 30. For purposes of explanation, each of the buffers 1–N is configured to store data transmitted between any of the N endpoints of USB device 30 and USB host 26 as will be more fully described below.

FIG. 5 shows a tag controller circuit 44 coupled to memory 46. Memory 46 stores buffer tags 1–N corresponding to buffers 1–N, respectively. Endpoint controller 32 or backend interface can read or write information via tag controller circuit 44 to any of the buffer tags in memory 46. In general, buffer tags 1–N contain information that identify an endpoint of USB device 30 that is the source or destination of data stored (or to be stored) in buffers 1–N, respectively. For example, buffer tags 3 and 4 may contain information (written by tag controller circuit 44) that identifies endpoint 2 of USB device 30 as the destination of data currently stored in buffers 3 and 4 of memory 36. At another time (i.e., after data of endpoint 2 stored in buffer 4 is replaced with new data), buffer tag 4 may identify endpoint 6 of USB device 30 as the destination of newly stored data in buffer 4 of memory 36. At yet another time, buffer tags 2–4 may indicate that buffers 2–4, respectively, will receive and store data from endpoint 5 for subsequent transmission to USB host 26 via endpoint controller 32 and cable/connection 28.

Figure 6:
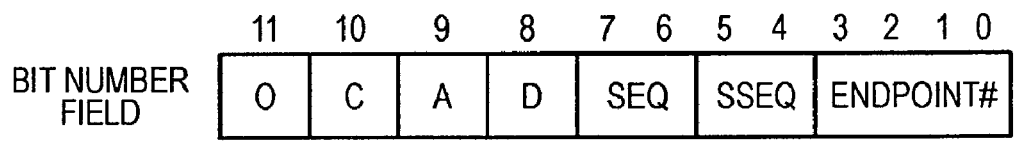
FIG. 6 illustrates one embodiment of the buffer tags shown in FIG. 5.

Each buffer tag 1–N includes a plurality of bits set to logical 1 or logical 0 by write operation of tag controller circuit 44 in response to requests from endpoint controller 32 and backend interface 34. In an alternative embodiment, endpoint controller 32 and backend interface 34 can write directly to each of the buffer tags 1–N. FIG. 6 illustrates an exemplary format of each of the buffer tags 1–N. The present invention should not be limited to the buffer tags shown in FIG. 6. With continuing reference to FIG. 6, bit 11 is designated O for owner, bit 10 is designed designated C for claimed, bit 9 is designated A for active, bit 8 is designated D for direction, bits 7 and 6 are designated SEQ for sequence, bits 5 and 4 are designated SSEQ for subsequence, and bits 3 through 0 are designated ENDPOINT#.

Bits 0 through 3 of each buffer tag store the endpoint number that identifies the endpoint that is the source or destination of the data stored in the corresponding buffer. At any point in time, one or more buffers in memory 36 may store data of separate transactions involving the same endpoint of USB device 30. The SEQ bits shown in FIG. 6 distinguish the buffers of memory 36 that store data of separate data transactions. For example, suppose buffers 1 and 2 of memory 36 store data destined for endpoint 3 of USB device 30 while buffer 5 also stores data destined for endpoint 3 of USB device. Further, suppose data stored in buffers 1 and 2 was received from the USB host 26 in a first data transaction, while the data in buffer 5 was received from the USB host 26 in a second and subsequent data transaction. In this situation, the ENDPOINT# bits (bits 0–3) of buffer tags 1, 2, and 5 will be set to "011" (i.e., binary 3) thus indicating that buffers 1, 2, and 5 store data destined for endpoint 3 of USB device 30. Additionally, the SEQ bits of buffer tags 1 and 2 may be set to "00" while the SEQ bits of buffer tag 5 is set to "01" thus indicating that data stored in buffers 1 and 2 was received from the USB host 26 in a data transaction that was earlier in time then the data transaction that contained the data stored in buffer 5.

As noted above, a transaction may contain more data than can be stored in a single buffer in memory 36. The SSEQ bits shown in FIG. 6 identifies the sequence in which data was received from USB host 26. In the example above, buffers 1 and 2 store data destined for endpoint 5 of USB device 30. The SEQ bits and ENDPOINT# bits of buffer tags 1 and 2 are set respectively to "00" and "011" as noted above. Suppose data stored in buffer 2 was received from USB host 26 before data stored in buffer 1. The SSEQ bits of buffer tags 1 and 2 can be set respectively to "01" and "00" thus indicating that buffer 2 stores data that was received before data stored in buffer 1. The SSEQ bits are required only when the size of each of the buffers in memory 36 is smaller than the amount of data contained in a data packet.

The direction or D bit in FIG. 6 indicates whether data in the corresponding buffer was received from the backend of USB device 30 for subsequent transmission to USB host 26 or whether data stored in the corresponding buffer was received from the USB host 26 for subsequent transmission to the backend of USB device 30. For example, when the D bit of buffer tag 3 is set to logical 1, the data stored in buffer 3 is destined for USB host 26, and when set to logical 0, the data of buffer 3 is destined to the backend. The active or A bit, when set to logical 1 indicates that data in the corresponding buffer is ready to be transmitted to the USB host 26 or ready to be transmitted to the backend of USB device 30, depending on the state of the D bit. The A bit is cleared once the data of the corresponding buffer is successfully read (i.e., transmitted to the USB host 26 or the endpoint of the USB device 30). Once the A bit is cleared, the corresponding buffer is readily available to store new data.

The claimed or C bit, when set to logical 1, indicates that the corresponding buffer has been claimed to receive and store data from an endpoint of the USB device 30 or from the USB host 26. The C bit may be set or cleared by the tag controller circuit 44 in response to a request from the endpoint controller 32 or the backend interface 34. For example, endpoint controller 32 may set the C bit of buffer tag 4 when endpoint controller 32 receives a token packet indicating that USB host 26 will subsequently transmit a data packet containing data destined for an endpoint of USB device 30. The C bit of buffer tag 4 is set to avoid the condition in which both endpoint controller 32 and backend interface 34 assume buffer 4 is readily available since the A bit of buffer tag 4 is cleared to logical 0. By setting the C bit of buffer tag 4 to logical 1, the endpoint controller reserves buffer 4 for storing data. Once data has been successfully stored in buffer 4, the C bit of tag 4 is cleared to logical 0 and the A bit of tag 4 is concurrently set to logical 1. The owner or O bit is set to logical 1 or 0 depending on whether the backend interface 34 or the endpoint controller 32 claims the corresponding buffer. The O bit is set to logical 1 when the endpoint controller claims the corresponding buffer, or the O bit is cleared to logical 0 if the backend interface 34 claims the corresponding buffer.

Figure 7:
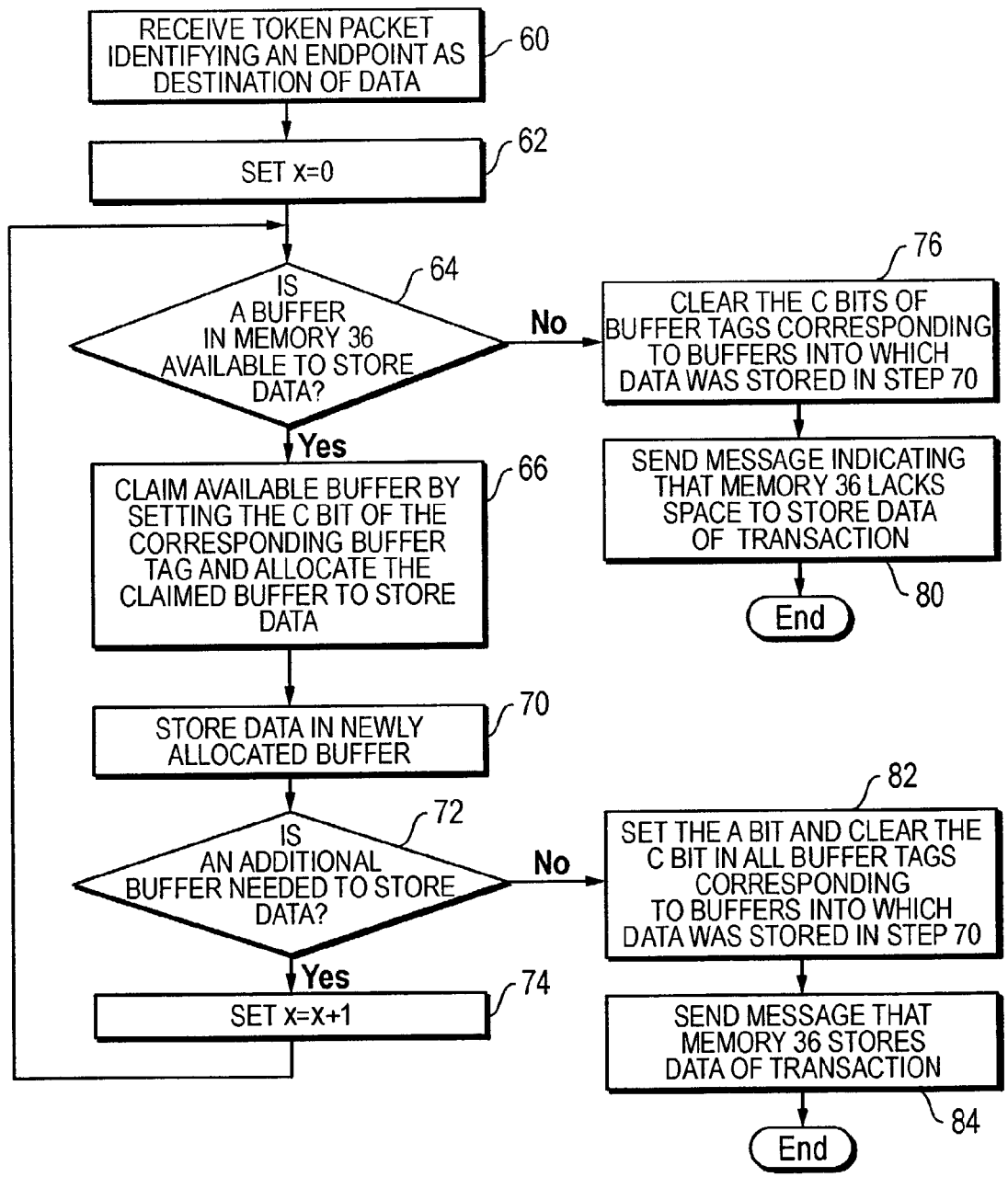
FIG. 7 is a flow chart illustrating operational aspects of writing data to one or more buffers of memory 36 in accordance with one embodiment of the invention.

As noted, the buffers of memory 36 temporarily store data of transactions that are transmitted between the USB host 26 and endpoints of USB device 30. For example, data from a particular endpoint of USB device 30 is stored in any one or more of buffers 1–N within memory 36 before the data is transmitted to USB host 26 in a data packet created by, for example, endpoint controller 32. Data can be written to any buffer within memory 36 by endpoint controller 32 in response to endpoint controller 32 receiving a data transaction from USB host 26, or by backend interface 34 in response to backend interface 34 receiving data from the embedded processor or application specific hardware of USB device 30. FIG. 7 illustrates operational aspects of writing data to one or more buffers of memory 36 in accordance with one embodiment of the present invention. The write data process shown in FIG. 7 can be performed by endpoint controller 32, backend interface 34, or by tag controller circuit 44. Additionally, the write process of FIG. 7 may be performed by a combination of the endpoint controller 32 and the tag controller circuit 44 operating in response to requests received from the endpoint controller 32, or the write process may be performed by a combination of the backend interface 34 and the tag controller circuit 44 operating in response to requests received from the backend interface 34. FIG. 7 will be described with reference to writing data to one or more buffers of memory 36 in response to endpoint controller 32 receiving a data transaction from USB host 26.

The write process of FIG. 7 initiates when USB host 26 sends a token packet of a data transaction to endpoint controller 32 of USB device 30. The token packet includes an endpoint number that identifies an endpoint of USB device 30 as the ultimate destination for data of the data transaction. In step 62 of FIG. 7, endpoint controller 32 or another device (e.g., tag controller circuit) sets a dummy variable x to 0 in response to endpoint controller 32 receiving the token packet. In step 64, buffer tags 1–N are accessed to determine whether a buffer in memory 36 is available to store data. A buffer is available to store data if its respective buffer tag has A and C bits set to logical 0. Accordingly, buffer tags are accessed to determine whether the A and C bits are set to logical 0 in one of the buffer tags 1–N. The A and C bits of each buffer tag can be checked by endpoint controller 32 or by tag controller circuit 44 in response to a request from endpoint controller 32.

If a buffer is available to store data, then in step 66 the available buffer is claimed and allocated to store data. The available buffer can be claimed and allocated by the endpoint controller 32 or the tag controller circuit in response to a request from the endpoint controller 32. It is noted that the available buffer can be claimed and allocated in one operation performed by the endpoint controller 32 or the tag controller circuit in response to a request from the endpoint controller 32. The available buffer is claimed by setting the C bit of its corresponding tag to logical 1. Buffer allocation includes changing the state of additional bits in the buffer tag corresponding to the available buffer. In one embodiment, buffer allocation includes clearing the D bit to logical 0, setting the O bit to logical 1, storing the endpoint number of the received token packet into the ENDPOINT# field, storing the current value of variable x into to SSEQ field, and storing an endpoint packet number into the SEQ field of the buffer tag corresponding to the available buffer. The endpoint packet number may be stored in a register in the bank of registers 40. The endpoint packet number defines the number of data packets currently stored within memory 36 and destined for the endpoint defined by the token packet received in step 60.

Optionally, if a buffer is identified as available to store data in step 64, the endpoint controller 32 or the tag controller circuit 44 can immediately (i.e., before the allocation process in step 66 is performed) reserve the available buffer. In one embodiment, the buffer is reserved by setting the C bit 1 in the buffer tag corresponding to the buffer that is available to store data. Once reserved, the corresponding buffer cannot be used by the backend interface 34 to store data until the buffer is later released. If reserving an available buffer is employed, then the allocation process of step 66 may include a search for unused buffer, i.e., a search for the buffer tag with it's A bit set to logical 0 and its C bit set to logical 0. Once this buffer tag is identified, the endpoint controller 32 or the buffer tag circuit operating in response to a request from the endpoint controller 32, may allocate the reserved buffer by storing the clearing the D bit to logical 0, setting the O bit to logical 1, storing the endpoint number of the received token packet into the ENDPOINT# field, storing the current value of variable x into to SSEQ field, and storing an endpoint packet number into the SEQ field of the buffer tag corresponding to the reserved buffer.

After allocation, the starting address of the allocated buffer is provided to endpoint controller 32. When endpoint controller 32 receives the data packet from USB host 26, endpoint controller 32 stores data in the newly allocated buffer beginning at the starting address thereof as shown in step 70. Data of the data packet may be greater than the size of the allocated buffer of memory 36. In step 72, either the tag controller circuit 44 or the endpoint controller 32 determines whether an additional buffer in memory 36 is needed to store data of the data packet. If another buffer is needed, then endpoint controller 32 or tag controller circuit 44 increments x by 1 in step 74 and the process returns to step 64 where a determination is made as to whether another buffer is available to store data. If no buffer is available within memory 36 to store data, then the endpoint controller 32 or the tag controller circuit 44 in step 76 clears the A and C bits of buffer tags corresponding to buffers into which data was stored during step 70. Thereafter, in step 80, a message failed acknowledge is sent to the USB host 26 indicating that the USB device 30 lacks sufficient buffer memory to store data of the transaction and the process ends. It is more likely, however, that one or more buffers are available to store data of the data transaction and the process will proceed through steps 66–74 of FIG. 7. After all data of the transaction is stored within one or more buffers of memory 36, and after endpoint controller 32 or the tag controller circuit 44 determines that no more memory is needed to store data, endpoint controller 32 or the tag controller circuit 44 in step 82 sets the A bit to logical 1 and clears the C bit to logical 0 in all buffer tags corresponding to buffers into which data was stored in step 70. Although not shown within FIG. 7, endpoint controller 32 or tag controller circuit 44 increments the endpoint packet number stored within one of the registers of control status registers 40. Lastly, in step 84, endpoint controller 30 sends a message to the backend interface 34 indicating that memory 36 stores data destined for the endpoint identified by the token packet received in step 60. The message may also include the packet size or the quantity of data stored within memory 36 during step 70 in addition to the endpoint identity.

Figure 8:
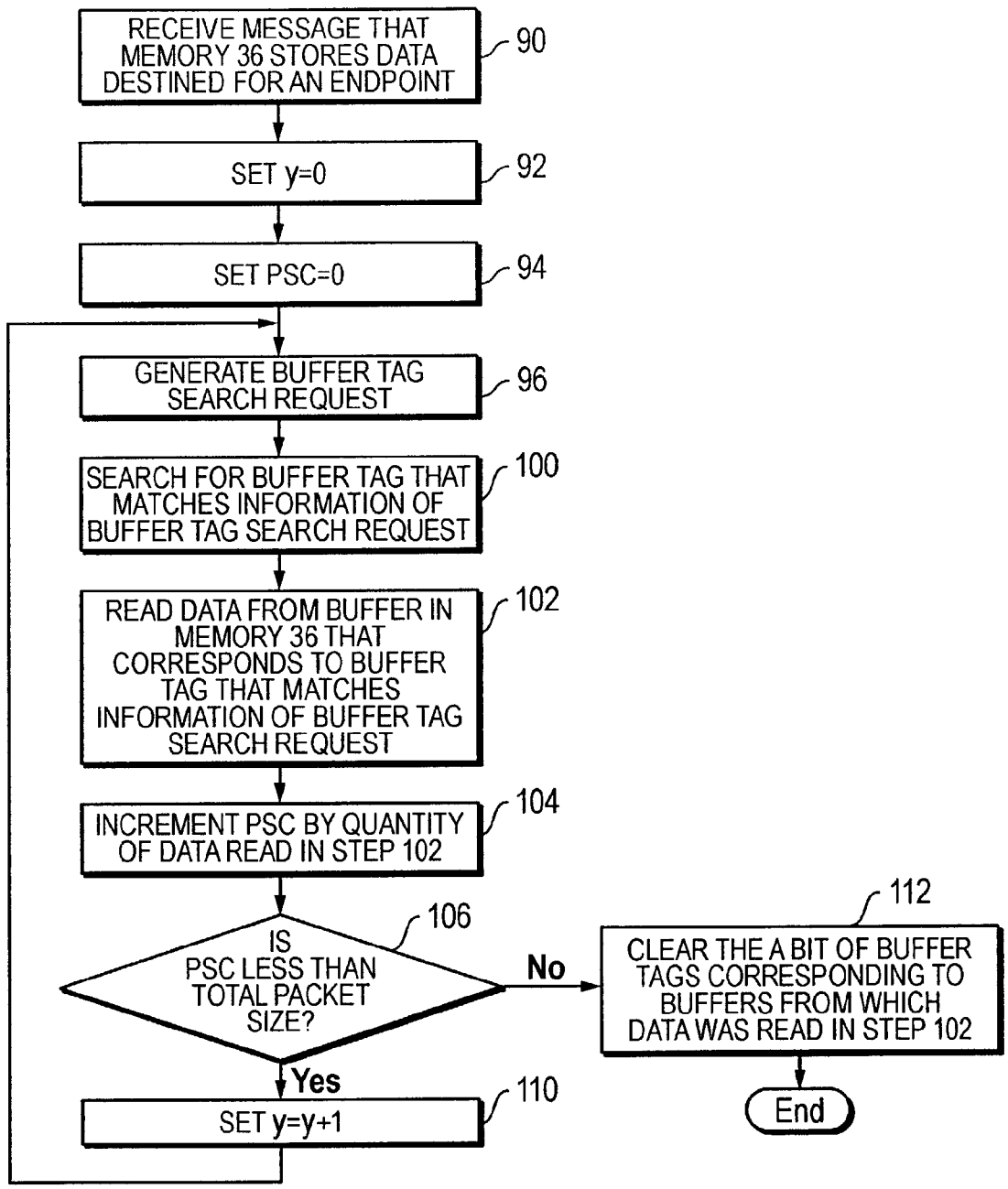
FIG. 8 is a flow chart illustrating operational aspects of reading data from one or more buffers of memory 36 in accordance with one embodiment of the invention.

As noted above, either endpoint controller 32 or backend interface 34 can read data temporarily stored within one or more buffers of memory 36. Endpoint controller 32 may read this data to form a data packet for subsequent transmission to USB host 36. In contrast, backend interface 34 may read this data from memory 36 for subsequent transmission to an endpoint of USB device 30. FIG. 8 illustrates operational aspects of reading data in one or more buffers within memory 36 in accordance with one embodiment of the present invention. It is noted that in general, the process described in FIG. 8 can be implemented by endpoint controller 32 or backend interface 34. FIG. 8 will be described with reference to backend interface 34 reading data from one or more data buffers in memory 36 in response to receiving a message from endpoint controller 32 that one or more buffers within memory 36 stores data destined for a particular endpoint of USB device 30.

In steps 92 and 94, backend interface 34 or tag controller circuit 44 sets dummy variable y to 0 and packet-size counter (PSC) to 0 after backend interface 34 receives a message that memory 36 stores data destined for an endpoint in step 90. The message received in step 90 may be the same message sent by the endpoint controller 32 in step 84 of FIG. 7. In step 96, a buffer tag search request is generated by backend interface 34 or tag controller circuit 44 in response. This request includes search information. In one embodiment, the search information includes the endpoint number of the message received in step 90, the current value of dummy variable y, and the current endpoint packet number that corresponds to the endpoint number of the message received in step 90. The search information is compared by backend interface 34 or tag controller circuit 44 to respective fields within buffer tags 1–N as shown in step 100. The buffer tags are compared to the search information until one is identified which has an ENDPOINT# field equal to the endpoint number of the search request, a SEQ field equal to the current endpoint packet number of the search request, a SSEQ field equal to the current value of variable y of the search request. If one of the buffer tags in memory 46 has fields which match the information of the search request in addition to D and C bits cleared to logical 0 and an A bit set to logical 1, then the starting address of the corresponding buffer in memory 36 is provided to the backend interface 34. Thereafter, in step 102 backend interface 34 reads data from the buffer in memory 36 that corresponds to the buffered tag that matches information of the buffered tag search request. Once all data is read from this buffer, then in step 104 backend interface 34 or tag controller circuit 44 increments PSC by the quantity of data read in step 102. Thereafter a determination is made as to whether the current value of PSC is less than the quantity of data identified within the message received in step 90. If the PSC is less than the total data, then in step 110, backend interface 34 or tag controller circuit 44 increments variable y by 1 in step 110 and the process repeats beginning at step 96. If, however, the PSC is equal to the quantity of data identified within the message of step 90, then in step 112, the A bit of each buffer tag corresponding to a buffer from which data was read in step 102, is cleared to logical 0, thereby indicating that the corresponding buffer is now available to store new data. Additionally, backend interface 34 or tag controller circuit 44 increments the endpoint packet number by 1. Incrementing the endpoint packet number allows the backend interface 34 or endpoint controller to synchronize the packet transmission/reception.

Although the present invention has been described in connection with several embodiments, the invention is not intended to be limited to the embodiments described herein. On the contrary, it is intended to cover such alternatives, modifications, and equivalents as can be reasonably included within the scope of the invention as defined by the appended claims.

What is claimed is:

1. A method comprising:
   a USB device receiving a first token packet from a USB host, wherein the first token packet comprises a first endpoint number, wherein the first endpoint number designates a first endpoint of the USB device;
   storing the first endpoint number into a first tag in response to receiving the first token packet, wherein the first tag corresponds to a first data buffer;
   the USB device receiving a first data packet from the USB host, wherein the first data packet comprises first endpoint data;
   storing first endpoint data of the first data packet into the first data buffer
   storing the first endpoint number into a second tag corresponding to a second data buffer;
   storing second endpoint data of the first data packet data into the second data buffer.

2. The method of claim 1 further comprising storing a first sequence number in each of the first and second tags.

3. The method of claim 2 further comprising:
   storing a first sub-sequence number in the first tag, and;
   storing a second sub-sequence number in the second tag.

4. The method of claim 1 further comprising:
   the USB device receiving a second token packet from the USB host, wherein the second token packet comprises a second endpoint number;
   storing the second endpoint number into a second tag corresponding to a second data buffer;
   the USB device receiving a second data packet from the USB host, wherein the second data packet comprises second endpoint data;
   storing first endpoint data of the second data packet into the second data buffer.

5. The method of claim 1 further comprising:
   the USB device receiving a second token packet from the USB host, wherein the second token packet comprises a second endpoint number;
   overwriting the first endpoint number stored in the first tag with the second endpoint number;
   the USB device receiving a second data packet from the USB host, wherein the second data packet comprises second endpoint data;
   overwriting the first endpoint data stored in the first data buffer with the second endpoint data of the second data packet.

6. A USB device comprising:
   a plurality of data buffers for storing data;
   a plurality of tags;
   an instruction memory storing instructions executable within the USB device, wherein a method is implemented when the instructions are executed, the method comprising:
   storing a first endpoint number into a first tag of the plurality of tags in response to the USB device receiving a first token packet comprising the first endpoint number, wherein the first endpoint number designates a first endpoint of the USB device;
   storing first endpoint data into a first data buffer of the plurality of data buffers;
   wherein the first tag corresponds to the first data buffer;
   storing the first endpoint number into a second tag of the plurality of tags;
   storing first endpoint data into a second data buffer of the plurality of data buffers;
   wherein the second tag corresponds to the second data buffer.

7. A USB device comprising:
   a plurality of data buffers for storing data;
   a plurality of tags;
   an instruction memory storing instructions executable within the USB device, wherein a method is implemented when the instructions are executed, the method comprising:
   storing a first endpoint number into a first tag of the plurality of tags in response to the USB device receiving a first token packet comprising the first endpoint number, wherein the first endpoint number designates a first endpoint of the USB device;
   storing first endpoint data into a first data buffer of the plurality of data buffers;
   wherein the first tag corresponds to the first data buffer;

storing a second endpoint number into the first tag such that the first endpoint number is overwritten with the second endpoint number;

storing second endpoint data into the first data buffer such that the first endpoint data is overwritten with the second endpoint data.

8. A USB device comprising:

a plurality of data buffers for storing data;

a plurality of tags stored in one or more memory devices, wherein the plurality of tags correspond to the plurality of data buffers, respectively;

a tag controller circuit for modifying each of the plurality tags;

an endpoint controller circuit configured to receive a first token packet from a USB host, wherein the first token packet comprises a first endpoint number, wherein the first endpoint number designates a first endpoint of the USB device;

wherein the tag controller circuit is configured to store the first endpoint number into a field of a first tag of the plurality of tags in response to the endpoint controller receiving the first token packet;

wherein the endpoint controller circuit is configured to receive a second token packet from the USB host, wherein the second token packet comprises a second endpoint number;

wherein the tag controller circuit is configured to overwrite the first endpoint number in the field of the first tag with the second endpoint number in response to the endpoint controller circuit receiving the second token packet.

9. The USB device of claim 8:

wherein the endpoint controller is configured to receive a first data packet from the USB host, wherein the first data packet comprises first endpoint data;

wherein the endpoint controller circuit is configured to store first endpoint data of the first packet in a first data buffer of the plurality of data buffers;

wherein the first data buffer corresponds to the first tag.

10. The USB device of claim 8:

wherein the tag controller circuit is configured to store the first endpoint number into a field of a second tag of the plurality of tags in response to the endpoint controller circuit receiving the first token packet;

wherein the endpoint controller circuit is configured to store first endpoint data of a first data packet into a second data buffer of the plurality of data buffers;

wherein the second data buffer corresponds to the second tag.

11. The USB device of claim 10 wherein:

wherein the endpoint controller circuit is configured to receive a second data packet from the USB host, wherein the second data packet comprises second endpoint data;

wherein the endpoint controller is configured to overwrite the first endpoint data stored in the first data buffer with second endpoint data of the second data packet.

12. A memory medium storing instructions executable a USB device comprising a processor, a plurality of data buffers, and a plurality of tags, wherein the USB device performs a method in response to executing the instructions, the method comprising:

storing a first endpoint number in a first tag in response to the USB device receiving a first token packet comprising the first endpoint number, wherein the first endpoint number designates a first endpoint of the USB device;

storing first endpoint data into a first data buffer in response to the USB device receiving a first data packet comprising the first endpoint data, wherein the first data buffer corresponds to the first tag;

storing the first endpoint number into a second tag after the first endpoint number is stored in the first tag;

storing first endpoint data of the first data packet into the second data buffer;

wherein the second tag corresponds to the second data buffer.

13. The memory medium of claim 12 wherein the method further comprises:

storing a second endpoint number into a second tag in response to the USB device receiving a second token packet, wherein the second token packet comprises the second endpoint number;

storing second endpoint data in a second data buffer in response to the USB receiving a second data packet, wherein the second data packet comprises the second endpoint data;

wherein the second data buffer corresponds to the second tag.

14. The memory medium of claim 12 wherein the method further comprises:

overwriting the first endpoint number stored in the first tag with a second endpoint number in response to the USB device receiving a second token packet, wherein the second token packet comprises the second endpoint number;

overwriting first endpoint data in the first data buffer with second endpoint data in response to the USB device receiving a second data packet, wherein the second data packet comprises the second endpoint data.

* * * * *